(12) United States Patent
Liu et al.

(10) Patent No.: US 7,973,464 B2
(45) Date of Patent: Jul. 5, 2011

(54) FIELD EMISSION ELEMENT HAVING CARBON NANOTUBE AND MANUFACTURING METHOD THEREOF

(75) Inventors: Liang Liu, Beijing (CN); Kai-Li Jiang, Beijing (CN); Shou-Shan Fan, Beijing (CN); Caesar Chen, Santa Clara, CA (US); Hsi-Fu Lee, Taipei Hsien (TW); Ga-Lane Chen, Santa Clara, CA (US)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 250 days.

(21) Appl. No.: 11/766,998

(22) Filed: Jun. 22, 2007

(65) Prior Publication Data

US 2007/0296323 A1   Dec. 27, 2007

(30) Foreign Application Priority Data

Jun. 23, 2006   (CN) .......................... 2006 1 0061306

(51) Int. Cl.
*H01J 1/62* (2006.01)
(52) U.S. Cl. ........................................ 313/495; 313/310
(58) Field of Classification Search .................. 313/310, 313/495–497
See application file for complete search history.

(56) References Cited

U.S. PATENT DOCUMENTS

| | | | |
|---|---|---|---|
| 6,682,677 B2 | 1/2004 | Lobovsky et al. | |
| 6,692,327 B1 | 2/2004 | Deguchi et al. | |
| 6,759,305 B2 | 7/2004 | Lee et al. | |
| 2002/0074932 A1* | 6/2002 | Bouchard et al. | 313/495 |
| 2002/0076846 A1* | 6/2002 | Ihm | 438/34 |
| 2003/0083421 A1 | 5/2003 | Kumar et al. | |
| 2004/0051432 A1 | 3/2004 | Jiang et al. | |
| 2004/0095050 A1 | 5/2004 | Liu et al. | |
| 2004/0118583 A1 | 6/2004 | Tonucci et al. | |
| 2004/0150312 A1* | 8/2004 | McElrath et al. | 313/310 |
| 2004/0189177 A1 | 9/2004 | Liu et al. | |
| 2004/0192153 A1 | 9/2004 | Liu et al. | |
| 2004/0209385 A1 | 10/2004 | Liu et al. | |

(Continued)

FOREIGN PATENT DOCUMENTS

CN   1410475   4/2003

(Continued)

OTHER PUBLICATIONS

Satish Kumar et al., Synthesis, Structure, and Properties of PBO/SWNT Composites, Macromolecules, vol. 35, No. 24, 2002, American Chemical Society, USA.

(Continued)

*Primary Examiner* — Bumsuk Won
(74) *Attorney, Agent, or Firm* — Jeffrey T. Knapp

(57) ABSTRACT

A given field emission element includes a carbon nanotube field emission wire and at least one supporting protective layer coating an outer surface of the carbon nanotube field emission wire. The carbon nanotube field emission wire is selected from a group consisting of a carbon nanotube yarn, a wire-shaped CNT-polymer composite, and a wire-shaped CNT-glass composite. A method for manufacturing the described field emission element includes the steps of: (a) providing one carbon nanotube field emission wire; (b) forming one supporting protective layer on an outer surface of the carbon nanotube field emission wire; and (c) cutting the carbon nanotube field emission wire to a predetermined length and treating the carbon nanotube emission wire to form the field emission element.

19 Claims, 3 Drawing Sheets

U.S. PATENT DOCUMENTS

| | | |
|---|---|---|
| 2005/0035701 A1 | 2/2005 | Choi et al. |
| 2005/0112051 A1 | 5/2005 | Liu et al. |
| 2005/0170177 A1 | 8/2005 | Crawford et al. |
| 2005/0228140 A1 | 10/2005 | Rajagopalan et al. |
| 2005/0239364 A1 | 10/2005 | Yang |
| 2006/0022568 A1 | 2/2006 | Komilovich et al. |
| 2006/0073332 A1 | 4/2006 | Huang et al. |
| 2006/0091782 A1 | 5/2006 | Liu et al. |
| 2006/0135677 A1 | 6/2006 | Huang et al. |
| 2008/0170982 A1* | 7/2008 | Zhang et al. ............... 423/447.3 |

FOREIGN PATENT DOCUMENTS

| | | |
|---|---|---|
| CN | 1493711 A | 5/2004 |
| CN | 1674192 | 9/2005 |
| TW | I231518 | 4/2005 |
| TW | 200519036 | 6/2005 |
| TW | I245079 | 12/2005 |
| TW | I246103 | 12/2005 |
| WO | WO2005004587 | 5/2005 |
| WO | 2007015710 | 2/2007 |

OTHER PUBLICATIONS

Mei Zhang et al., Multifunctional Carbon Nanotube Yarns by Downsizing an Acient Technology, Science, vol. 306, p. 1358-1361, Nov. 19, 2004.

Taylor,G.F et al., A Method of Drawing Metallic Filaments and a Discussion of Their Properties and Uses, Physical Review vol. 23,655-660, May 31, 1924.

Vigolo et al., Macroscopic Fibers and Ribbons of Oriented Carbon Natubes, Science, vol. 290, p. 1358-1361, Nov. 17, 2000.

* cited by examiner

FIELD EMISSION ELEMENT HAVING CARBON NANOTUBE AND MANUFACTURING METHOD THEREOF

RELATED APPLICATIONS

This application is related to a commonly-assigned application entitled, "FIELD EMISSION ELEMENT HAVING CARBON NANOTUBE AND MANUFACTURING METHOD THEREOF" with the same assignee, and a copending U.S. patent application Ser. No. 11/766,996, filed on Jun. 22, 2007.

BACKGROUND OF THE INVENTION

1. Field of the Invention

The invention relates to field emission elements and manufacturing methods thereof and, particularly, to a field emission element employing carbon nanotubes and a manufacturing method thereof.

2. Description of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). Carbon nanotubes are electrically conductive along their length, are chemically stable, and can each have a very small diameter (much less than 100 nanometers) and a large aspect ratio (length/diameter). Due to these and other properties, it has been suggested that carbon nanotubes can play an important role in fields such as microscopic electronics, field emission devices, thermal interface materials, etc.

Generally, a CNT field emission element includes a conductive cathode electrode and a carbon nanotube formed on the cathode electrode. The carbon nanotube acts as an emitter of the field emission element. The methods adopted for forming the carbon nanotube on the conductive cathode electrode mainly include mechanical methods and in-situ synthesis methods. One mechanical method is performed by using an atomic force microscope (AFM) to place a synthesized carbon nanotube on a conductive cathode electrode and to then fix the carbon nanotube on the conductive cathode electrode, via a conductive paste or adhesive. The mechanical method is relatively easy/straightforward. However, the precision and efficiency thereof are relatively low. Furthermore, the electrical connection between the conductive base and the carbon nanotube tends to be poor because of the limitations of the conductive adhesives/pastes used therebetween. Thus, the field emission characteristics of the carbon nanotube are generally unsatisfactory.

One in-situ synthesis method is performed by coating metal catalysts on a conductive cathode electrode and directly synthesizing a carbon nanotube on the conductive cathode electrode by means of chemical vapor deposition (CVD). The in-situ synthesis method is relatively easy. Furthermore, the electrical connection between the conductive base and the carbon nanotube is typically good because of the direct engagement therebetween. However, the mechanical connection between the carbon nanotube and the conductive base often is relatively weak and thus unreliable. Thus, in use, such a carbon nanotube is apt, after a period of time, to break away (partially or even completely) from the conductive cathode electrode, due to the mechanical stress associated with the electric field force. Such breakage/fracture would damage the field emission electron source and/or decrease its performance. Furthermore, in the in-situ synthesis method, controlling of the growth direction of the carbon nanotube is difficult to achieve during the synthesis process. Thus, the production efficiency thereof can be relatively low, and the controllability thereof is often less than desired. Still furthermore, the in-situ synthesis method has a relatively high cost.

What is needed, therefore, is a field emission element that promotes a good mechanical and electrical connection between the carbon nanotube and the conductive cathode electrode and that, thus, tends to have satisfactory field emission characteristics.

What is also needed is a method for manufacturing the above-described field emission electron source, the method having a relatively low cost, relatively high production efficiency, and an improved controllability.

SUMMARY OF THE INVENTION

In one embodiment, a field emission element includes at least one carbon nanotube field emission wire and at least one supporting protective layer coating an outer surface of a respective carbon nanotube field emission wire. The carbon nanotube field emission wire is selected from a group consisting of a carbon nanotube yarn, a wire-shaped CNT-polymer composite and a wire-shaped CNT-glass composite.

In another embodiment, a method for manufacturing the described field emission element includes the steps of: (a) providing at least one carbon nanotube field emission wire; (b) forming at least one supporting protective layer on an outer surface of a respective carbon nanotube field emission wire to yield at least one coated carbon nanotube field emission wire; and (c) cutting each coated carbon nanotube field emission wire to a predetermined length and treating the carbon nanotube emission wire to form the field emission element.

Other advantages and novel features of the present field emission element and the related manufacturing method will become more apparent from the following detailed description of preferred embodiments when taken in conjunction with the accompanying drawings.

BRIEF DESCRIPTION OF THE DRAWINGS

Many aspects of the present field emission element and the related manufacturing method can be better understood with reference to the following drawings. The components in the drawings are not necessarily to scale, the emphasis instead being placed upon clearly illustrating the principles of the present field emission element and the related manufacturing method.

Figure 1:
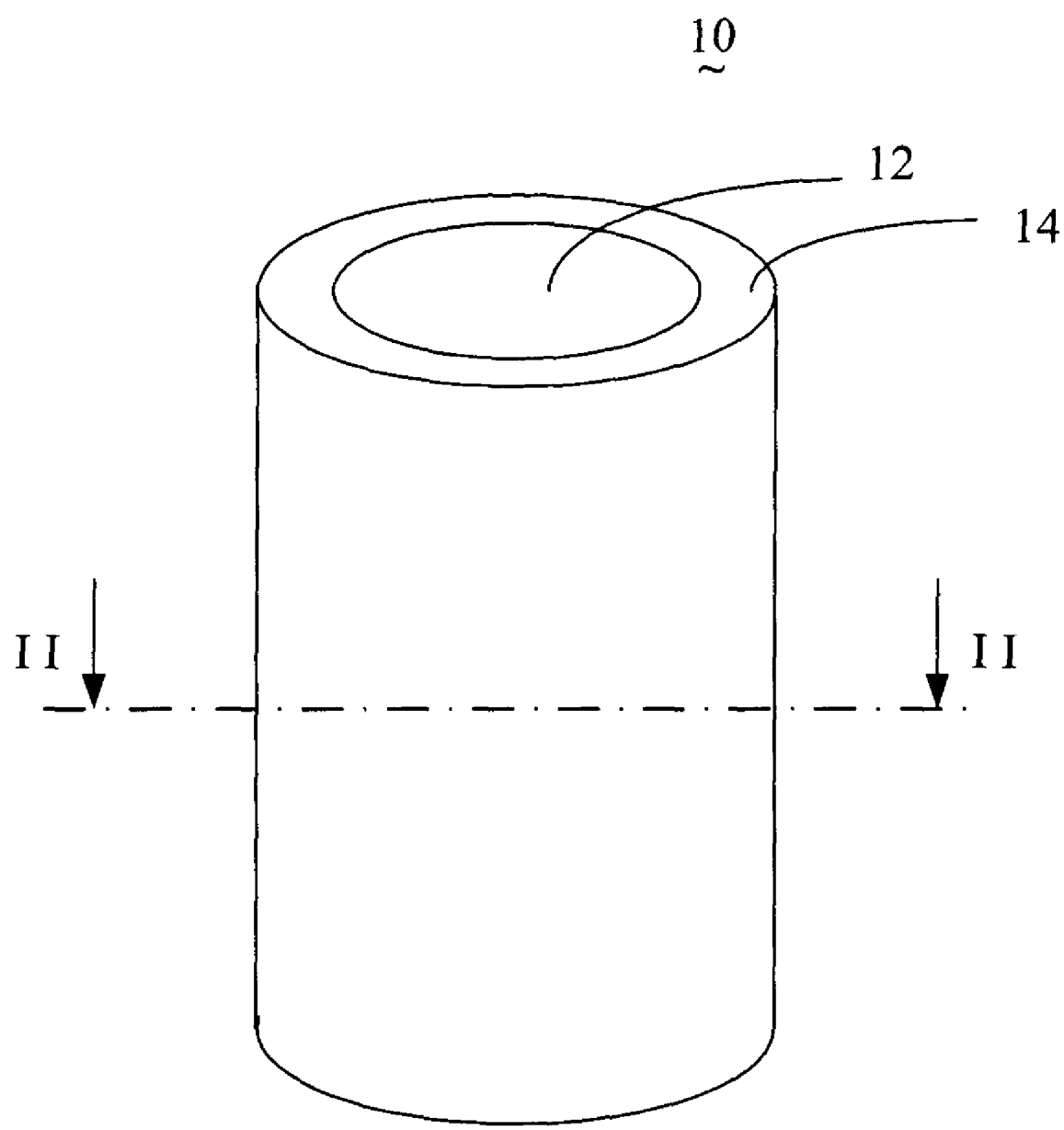
FIG. 1 is an isometric view of a field emission element, in accordance with an exemplary embodiment of the present device, the field emission element incorporating a CNT field emission wire.

Corresponding reference characters indicate corresponding parts throughout the several views. The exemplifications set out herein illustrate at least one preferred embodiment of the present field emission element and the related manufacturing method, in one form, and such exemplifications are not to be construed as limiting the scope of the invention in any manner.

DETAILED DESCRIPTION OF THE INVENTION

Reference will now be made to the drawings to describe embodiments of the present field emission element and the related manufacturing method, in detail.

Figure 2:
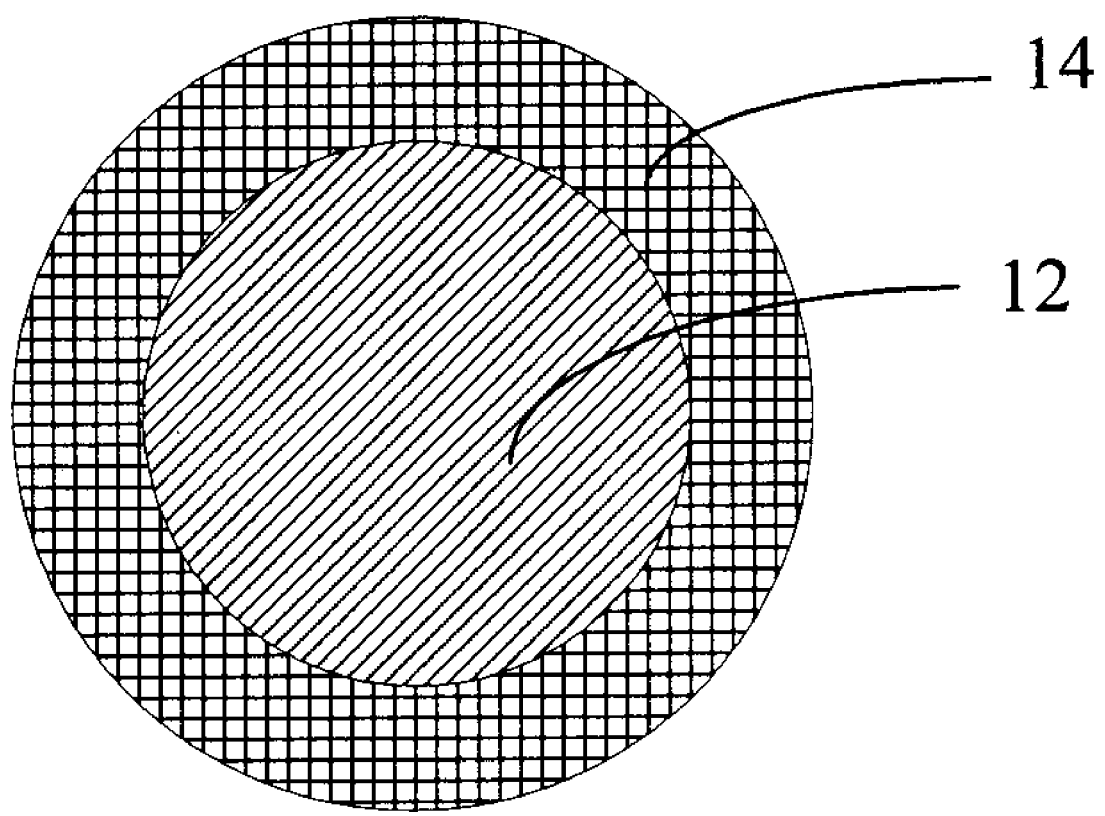
FIG. 2 is a cross-sectional view of the field emission element of FIG. 1, along line II-II.

FIG. 1 is an isometric view of a field emission element 10, in accordance with an exemplary embodiment of the present device, and FIG. 2 is a cross-sectional view of the upper portion of the field emission element 10 of FIG. 1. As shown in FIGS. 1 and 2, the field emission element 10 illustrated includes one carbon nanotube field emission wire 12 and a supporting protective layer 14 coating an outer surface of the carbon nanotube field emission wire 12. The carbon nanotube field emission wire 12 is used for emitting electrons, and the supporting protective layer 14 is configured (i.e., structured and arranged) for supporting and protecting the carbon nanotube field emission wire 12. The supporting protective layer, beneficially, further may, at least in part, help to attach/bond the field emission element 10 to a corresponding cathode (not shown). It is to be understood that one or more such field emission elements 10 could be employed within a given device (not shown).

The carbon nanotube field emission wire 12 can, beneficially, be made of at least one carbon nanotube yarn, which is made, e.g., by dry-spinning from a super-aligned carbon nanotube array. A diameter of the carbon nanotube field emission wire 12 made of carbon nanotube yarn is in the approximate range from 2 micrometer to 200 micrometers. Alternatively, the carbon nanotube field emission wire 12 can be also made of a wire-shaped CNT-polymer composite or a wire-shaped CNT-glass composite. A diameter of the carbon nanotube field emission wire 12 made of such a composite is in the approximate range from 0.1 micrometer to 5 millimeters.

The wire-shaped CNT-polymer composite includes a polymer and a plurality of carbon nanotubes uniformly dispersed therein. Usefully, the polymer incorporates at least one material selected from a group consisting of Polyethylene Terephthalate (PET), Polycarbonate (PC), Acrylonitrile-Butadiene Styrene Terpolyer (ABS), and Polycarbonate/Acrylonitrile-Butadiene Styrene Terpolyer (PC/ABS). To achieve a better dispersing effect of the carbon nanotubes, the percent by mass of the carbon nanotubes in the CNT-polymer composite is in the approximate range from 0.2% to 10%, a length of the carbon nanotubes in the CNT-polymer composite is in the approximate range from 0.1 micrometers to 20 micrometers, and a diameter of the carbon nanotubes in the CNT-polymer composite is in the approximate range from 0.5 nanometers to 100 nanometers. In one advantageous embodiment, the percent by mass of the carbon nanotubes in the CNT-polymer composite is about 2%.

The CNT-glass composite includes glass and a plurality of carbon nanotubes and conductive particles uniformly dispersed therein. The conductive particles can, advantageously, be silver, a silver alloy, or indium tin oxide (ITO). Quite suitably, the conductive particles are silver or a high-silver content (e.g., ~90%+) alloy, and the mass of the silver material is about 15 times of that of the glass. To achieve a better dispersing effect of the carbon nanotubes, the percent by mass of the carbon nanotubes in the CNT-glass composite is in the approximate range from 0.2% to 10%, a length of the carbon nanotubes in the CNT-glass composite is in the approximate range from 0.1 micrometers to 20 micrometers, and a diameter of the carbon nanotubes in the CNT-glass composite is in the approximate range from 0.5 nanometers to 100 nanometers. In one beneficial embodiment, the percent by mass of the carbon nanotubes in the CNT-glass composite is about 2%.

The supporting protective layer 14 may be made of at least one material selected from a group consisting of copper, silver, gold, nickel, molybdenum, or another corrosion and heat resistant metal. It may prove especially advantageous for the supporting protective layer 14 to made of an emissive metal, such as molybdenum or niobium, as that material could contribute to both the mechanical and field emission properties of the field emission element 10. Alternatively, the supporting protective layer 14 can also be made of glass and/or a ceramic. A thickness of the supporting protective layer 14 is in the approximate range from 1 micrometer to 1000 micrometers. That said, it is possible for the thickness thereof to be created on the nanometer-scale range, especially for those situations in which, as a further alternative, a nano-scale-diameter carbon nanotube field emission wire 12 is employed, e.g., to promote greater emitter density. Furthermore, it is to be understood that more than one supporting protective layer 14 may be provided, e.g., to provide for greater support and/or to allow a gradient of material properties across the multiple supporting protective layers 14.

In use, at least one field emission element 10 is fixed on a conductive cathode electrode (not shown), at least in part via the at least one respective supporting protective layer 14 thereon, to form at least one corresponding field emission electron source. Furthermore, a plurality of field emission elements 10 may be fixed on a conductive cathode electrode, at least partially, via the at least one respective supporting protective layer 14 thereon, to form an array of field emission electron sources. Opportunely, the carbon nanotube field emission wire 12 of the field emission element 10 has an electrical connection with the conductive cathode electrode. With such a connection, voltage may be applied directly from the conductive cathode electrode to the carbon nanotube field emission wire 12. Alternatively, voltage may be applied from the conductive cathode electrode to the carbon nanotube field emission wire 12, at least in part, via the supporting protective layer 14. It is to be understood that the supporting protective layer 14 could enhance or, possibly, entirely provide the electrical connection of the carbon nanotube field emission wire 12 with the conductive cathode electrode, presuming in such an instance a sufficiently conductive material is employed for the supporting protective layer(s) 14. Additionally, the increase in diameter of the base of the carbon nanotube field emission wire 12 provided by the supporting protective layer (s) 14 improves the lateral stability of the connection thereof with the cathode.

Due to the carbon nanotubes in the carbon nanotube field emission wire 12 having good field emission characteristics and the carbon nanotube field emission wire 12 being fixed on the conductive cathode electrode by the supporting protective layer 14, the mechanical connection between the carbon nanotube field emission wire 12 and the cathode electrode is firm, and the electrical connection therebetween is sufficient. Thus, the electron emitting performance of the field emission element 10 is improved.

Figure 3:
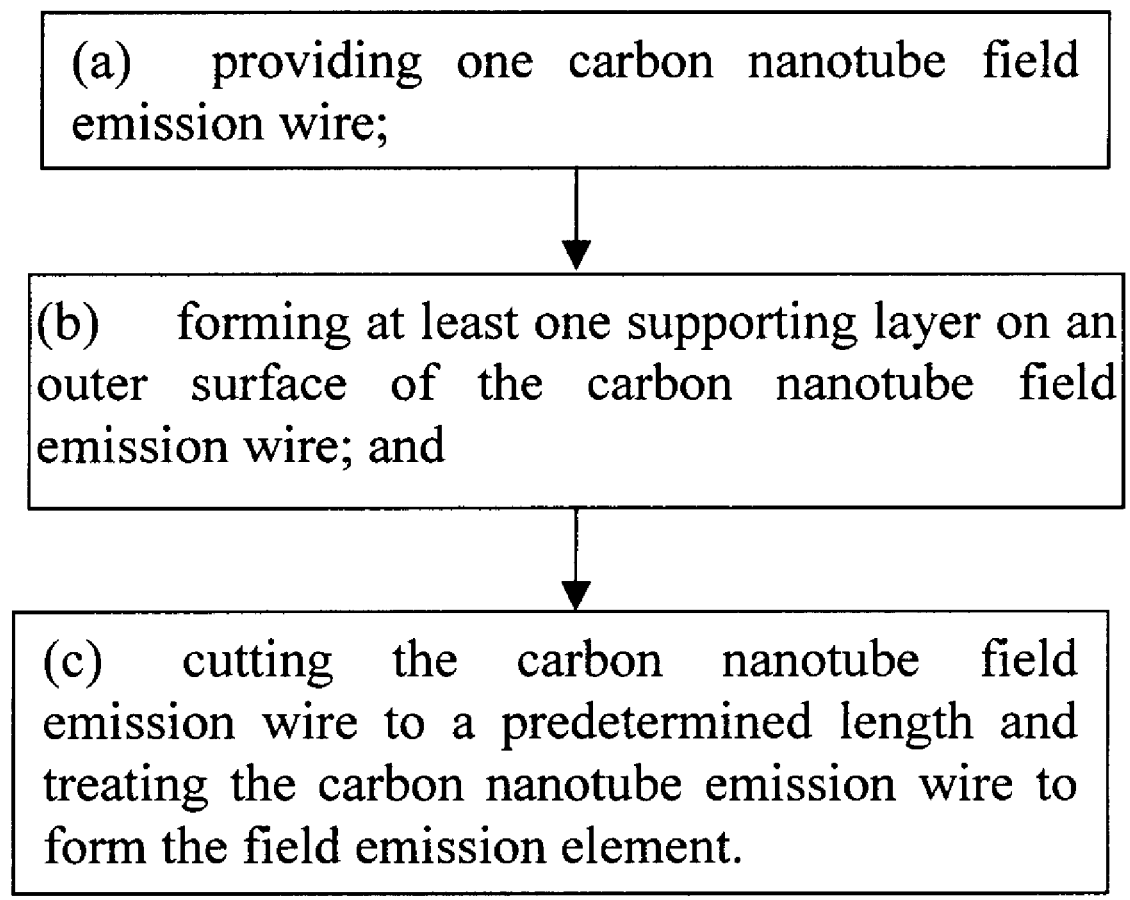
FIG. 3 is a flow chart showing a method for manufacturing the field emission element of FIG. 1.

Referring to FIG. 3, a method for manufacturing at least one field emission element 10 includes the following steps:

(a): providing at least one carbon nanotube field emission wire 12;

(b): forming at least one supporting protective layer 14 on an outer surface of each respective carbon nanotube field emission wire 12 to yield at least one coated carbon nanotube field emission wire 12; and (c): cutting each coated carbon nanotube field emission wire 12 to a predetermined length and treating the carbon nanotube field emission wire 12 to thereby form the at least one field emission element 10.

The carbon nanotube field emission wire 12 can be made of a carbon nanotube yarn, a wire-shaped CNT-polymer composites, and a wire-shaped CNT-glass composites. When a CNT yarn is adopted as the carbon nanotube field emission wire 12, the step (a) comprises the following steps:

(a1) providing a super-aligned CNT array; and
(a2) selecting and drawing out a bundle of carbon nanotubes from a CNT array to form the CNT yarn.

Step (a2) is executed as follows. A bundle of the carbon nanotubes is selected and drawn out from the super-aligned carbon nanotube array using forceps or another gripping/pulling means, to form the carbon nanotube yarn along the drawing direction. The bundles of the carbon nanotubes are connected together by Van Der Waals force interactions to form a continuous carbon nanotube yarn.

It is to be noted that not all carbon nanotube arrays can be used to create the carbon nanotube yarns. The carbon nanotube yarns can only effectively be drawn out from the super-aligned carbon nanotube arrays. Based on extensive experimentation on the growth mechanisms of carbon nanotubes, the crucial factors for growing the super-aligned carbon nanotube array suitable for production of the yarns are listed below:

i) the substrate for growing the carbon nanotube array should be substantially flat and smooth;
ii) the growth rate of the carbon nanotube array should be relatively high; and
iii) the partial pressure of the carbon containing gas should be relatively low.

In general, a diameter of the carbon nanotube yarn can be controlled by a size of a tip of the tool that is used to pull out the yarn. The smaller the tip is, the smaller the diameter is. A length of the carbon nanotube yarn depends on an area of the super-aligned carbon nanotube array. A force used to pull out the yarn depends on the diameter of the carbon nanotube yarn. As general rule, the bigger the width and/or thickness of the carbon nanotube yarn is, the bigger the force needed to pull the carbon nanotube yarn. Usefully, the diameter of the carbon nanotube yarn is in the approximate range from about 2 micrometers to 200 micrometers. It is to be understood that nano-scale range diameters could be generated for, e.g., instances in which a large emitter density is desired.

When a wire-shaped CNT-polymer composite is adopted as the carbon nanotube field emission wire 12, the step (a) comprises the following steps:
(a1') adding and dispersing a plurality of carbon nanotubes in a melted polymer;
(a2') drawing a strand from the melted polymer ; and
(a3') cooling the strand and cutting the strand to size to form at least one carbon nanotube field emission wire 12.

The carbon nanotubes adopted in step (a1') can be obtained by a conventional method such as chemical vapor deposition, arc discharging, or laser ablation. Quite suitably, the carbon nanotubes are obtained by chemical vapor deposition. A diameter of each carbon nanotube is about in the range from 0.5 nanometers to 100 nanometers. In step (a1'), the carbon nanotubes are uniformly dispersed in the melted polymer by means of, e.g., milling.

When a CNT-glass composite is adopted as the carbon nanotube field emission wire 12, the step (a) comprises the following steps:
(a1") providing and mixing a plurality of carbon nanotubes, conductive particles, organic carriers, and glass powder to form a paste;
(a2") forming the paste into the shape of the carbon nanotube field emission wire 12; and
(a3") drying, rubbing, dusting and sintering the paste to form the carbon nanotube field emission wire 12.

In step (a1"), the organic carriers is a mixture of terpineol and ethyl cellulose. The mixture is formed at a temperature of about 80° C. by means of a water bath. In the mixture, the terpineol acts as a solvent, and the ethyl cellulose serves as a stabilizing agent. Furthermore, the percent by mass of the terpineol in the organic carrier mixture is about 95%, and the percent by mass of the ethyl cellulose in the mixture is about 5%. The carbon nanotubes adopted in step (a1") can be obtained by a conventional method such as chemical vapor deposition, arc discharging, or laser ablation. Very usefully, the carbon nanotubes are obtained by chemical vapor deposition. A diameter of each carbon nanotube is about in the range from 0.5 nanometer to 100 nanometers, and a length thereof is about in the range from 0.1 micrometer to 20 micrometers.

Quite suitably, the percent by mass of the organic carriers in the paste is about 20%, the percent by mass of the conductive metal particles in the paste is about 75%, and the percent by mass of the glass powder in the paste is about 5%. The percent by mass of the carbon nanotubes in the CNT-glass composite is in the approximate range from 0.2% to 10%. Opportunely, the percent by mass of the carbon nanotubes in the CNT-glass composite is about 2%.

In step (a3"), the processes of drying and sintering is performed in the approximate range from 300° C. to 600° C. The process of drying is used to volatilize the organic carriers, and the process of sintering is used to melt the glass powder to bond (e.g., as per a glass solder composition) the conductive metal particles with the carbon nanotubes.

In step (b), the method by which the supporting protective layer 14 is formed is determined, in large part, by the material used for such. The supporting protective layer 14, if formed a of metal material, can, for example, be formed on the outer surface of a given carbon nanotube field emission wire 12 by a method selected from a group consisting of vacuum plating, chemical plating, electro-plating, melted metal coating, and powder metallurgy. The supporting protective layer 14, if made of a ceramic (e.g., alumina, silicon carbide, silicon nitride, etc.), can usefully be formed on the outer surface of the carbon nanotube field emission wire 12 by powder pressing and sintering. The supporting protective layer 14, should it be composed of glass, can be formed on the outer surface of the carbon nanotube field emission wire 12, e.g., by as a molten coating or by powder pressing and sintering.

The field emission element 10 can be made directly according to the actual length needed. Alternatively, the field emission element 10 can be made relatively long and then cut according to the actual length needed by means of, e.g., mechanical cutting or laser cutting. Furthermore, a surface treating process can be executed on a given field emission element 10. The surface treating process can, beneficially, be a laser irradiating process or a mechanical rubbing process. This surface treating process can help ensure that at least part or even all of the carbon nanotubes dispersed in the polymer or glass open at least one end thereof. This treatment can enhance the field emission performance of the carbon nanotubes. Furthermore, a large current field emission aging process can be executed to the field emission element 10 to further enhance the field emission performance of the carbon nanotubes.

Compared with the conventional field emission element, the field emission element 10 of the present embodiment has the following virtues. Firstly, a carbon nanotube field emission wire 12 of the field emission element 10 adopts carbon nanotubes, and the carbon nanotubes have excellent field emission performance inherently. Thus, the field emission element 10 has relatively excellent field emission performance. Secondly, the supporting protective layer 14 can support and secure the carbon nanotube field emission wire 12. This support ensures that the field emission element 10 has excellent mechanical characteristics. Thus, the field emission element 10 of this configuration can be made easily and used in field emission devices conveniently.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A field emission element comprising:
   a carbon nanotube field emission wire having an outer surface, wherein the carbon nanotube field emission wire emits electrons; and at least one supporting protective layer coating the outer surface of the carbon nanotube field emission wire supporting and protecting the carbon nanotube field emission wire, wherein the at least one supporting protective layer comprises metal.

2. The field emission element as claimed in claim 1, wherein the carbon nanotube field emission wire is a wire-shaped CNT-polymer composite, and the CNT-polymer composite comprises a polymer composite and a plurality of carbon nanotubes uniformly dispersed in the polymer composite.

3. The field emission element as claimed in claim 2, wherein a percent by mass of the carbon nanotubes in the CNT-polymer composite is in a range from about 0.2% to about 10%.

4. The field emission element as claimed in claim 3, wherein the polymer composite comprises a material selected from the group consisting of Polyethylene Terephthalate, Polycarbonate, Acrylonitrile-Butadiene Styrene Terpolyer and Polycarbonate/Acrylonitrile-Butadiene Styrene Terpolyer.

5. The field emission element as claimed in claim 1, wherein the carbon nanotube field emission wire is a wire-shaped CNT-glass composite, and the CNT-glass composite comprises glass and a plurality of carbon nanotubes and conductive metal particles uniformly dispersed in the glass.

6. The field emission element as claimed in claim 5, wherein a percent by mass of the carbon nanotubes in the CNT-glass composite is in a range from about 0.2% to about 10%.

7. The field emission element as claimed in claim 1, wherein a thickness of the at least one supporting protective layer is in a range from about 1 micrometer to about 1000 micrometers.

8. The field emission element as claimed in claim 1, wherein a diameter of the carbon nanotube field emission wire is in a range from about 0.1 micrometers to about 5 millimeters.

9. The field emission element as claimed in claim 1, wherein the metal is a corrosion and heat resistant metal selected from the group consisting of copper, silver, gold, nickel, molybdenum, and niobium.

10. The field emission element as claimed in claim 1, wherein the carbon nanotube field emission wire is a carbon nanotube yarn, and the carbon nanotube yarn comprises a plurality of bundles of carbon nanotubes.

11. The field emission element as claimed in claim 10, wherein the bundles of the carbon nanotubes are connected together by van der Waals force interactions to form the carbon nanotube yarn which is continuous.

12. The field emission element as claimed in claim 1, wherein the metal is an emissive metal selected from the group consisting of molybdenum and niobium.

13. The field emission element as claimed in claim 1, wherein the at least one supporting protective layer comprises a plurality of supporting protective layers, and a gradient of material properties is across the plurality of supporting protective layers.

14. A field emission element comprising:
    a carbon nanotube field emission wire emitting electrons and comprising a plurality of bundles of carbon nanotubes and an outer surface; and
    at least one supporting protective layer coated on the outer surface of the carbon nanotube field emission wire supporting and protecting the carbon nanotube field emission wire, wherein the at least one supporting protective layer is made of metal.

15. The field emission element as claimed in claim 14, wherein the bundles of the carbon nanotubes are connected together by van der Waals force interactions to form the carbon nanotube field emission wire which is continuous.

16. The field emission element as claimed in claim 14, wherein the metal is a corrosion and heat resistant metal selected from the group consisting of copper, silver, gold, nickel, molybdenum, and niobium.

17. The field emission element as claimed in claim 14, wherein the metal is an emissive metal selected from the group consisting of molybdenum, and niobium.

18. The field emission element as claimed in claim 14, wherein the at least one supporting protective layer comprises a plurality of supporting protective layers, and a gradient of material properties is across the plurality of supporting protective layers.

19. A field emission element comprising:
    a carbon nanotube field emission wire having an outer surface and emitting electrons; and a plurality of supporting protective layers coating the outer surface of the carbon nanotube field emission wire and supporting and protecting the carbon nanotube field emission wire, wherein the plurality of supporting protective layers is metallic.

* * * * *